(12) United States Patent
Tsai et al.

(10) Patent No.: US 10,474,362 B2
(45) Date of Patent: Nov. 12, 2019

(54) FLASH-BASED BLOCK STORAGE SYSTEM WITH TRIMMED SPACE MANAGEMENT AND METHOD OF OPERATION THEREOF

(71) Applicant: SMART Modular Technologies, Inc., Newark, CA (US)

(72) Inventors: Victor Y. Tsai, Palo Alto, CA (US); Robert Fillion, Haverhill, MA (US)

(73) Assignee: SMART Modular Technologies, Inc., Newark, CA (US)

( * ) Notice: Subject to any disclaimer, the term of this patent is extended or adjusted under 35 U.S.C. 154(b) by 0 days.

(21) Appl. No.: 15/294,678

(22) Filed: Oct. 14, 2016

(65) Prior Publication Data
US 2018/0107400 A1 Apr. 19, 2018

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0688* (2013.01); *G06F 12/0246* (2013.01); *G06F 3/0659* (2013.01); *G06F 2212/7201* (2013.01)

(58) Field of Classification Search
CPC ...... G06F 3/0608; G06F 3/0647; G06F 3/067; G06F 3/0679; G06F 3/0688
See application file for complete search history.

(56) References Cited

U.S. PATENT DOCUMENTS

| 2012/0054465 | A1 | 3/2012 | Post et al. |
| 2012/0221776 | A1 | 8/2012 | Yoshihashi et al. |
| 2013/0219106 | A1* | 8/2013 | Vogan ............... G06F 12/0246 711/103 |
| 2013/0275660 | A1 | 10/2013 | Bennett |
| 2014/0095767 | A1 | 4/2014 | Trika et al. |
| 2014/0101375 | A1 | 4/2014 | Thatcher et al. |
| 2014/0237164 | A1* | 8/2014 | Le ....................... G06F 12/0246 711/103 |
| 2017/0115890 | A1* | 4/2017 | Devendrappa ........ G06F 3/0616 |
| 2017/0185322 | A1* | 6/2017 | Stephens ............... G06F 3/0619 |

OTHER PUBLICATIONS

World Intellectual Property Organization, Application No. PCT/US17/55945, International Search Report dated Jan. 22, 2018.
World Intellectual Property Organization, Application No. PCT/US17/55945, Pending Claims as of Jan. 22, 2018.

* cited by examiner

*Primary Examiner* — Tracy A Warren
(74) *Attorney, Agent, or Firm* — Wong & Rees LLP (57) ABSTRACT

Approaches, techniques, and mechanisms are disclosed for a method of operation of a Flash-based block storage system including: transferring a first data to a logical block address; storing the first data in a physical block, of a storage array, associated with the logical block address; receiving a trim command for the logical block address; establishing a reserved physical block associated with the logical block address of the trim command; transferring second data for writing to the logical block address of the trim command; releasing the reserved physical block associated with the logical block address; and writing the second data to the logical block address.

20 Claims, 4 Drawing Sheets

FLASH-BASED BLOCK STORAGE SYSTEM WITH TRIMMED SPACE MANAGEMENT AND METHOD OF OPERATION THEREOF

TECHNICAL FIELD

Embodiments relate generally to block storage devices, and more particularly to Flash-based block storage devices used for computer operations.

BACKGROUND

Due to performance advantages of solid state storage devices as compared to magnetic media storage devices, it is often desirable for host computer operations to utilize Flash-based block storage devices as a primary storage media. However, traditional memory management techniques are often inadequate for utilizing Flash-based block storage devices. For example, many file systems handle delete operations by flagging deleted data blocks as "not in use," and the deleted data blocks are eventually overwritten by new data. However, because of how some solid state storage devices function at the lowest level, an overwrite produces significant overhead compared to writing data into an empty page, potentially crippling write performance.

For this and other reasons, various interfaces support a "trim" command (known as TRIM in the ATA command set, and UNMAP in the SCSI command set). The trim command allows an operating system executing on a host computing device to inform a connected solid-state storage device which logical blocks of data are no longer considered in use and can be marked as such (thus freeing the blocks to store new data or be wiped internally). Trimming enables the solid state storage devices to handle garbage collection overhead of the logical blocks, which would otherwise significantly slow down future write operations to the involved physical blocks, in advance. Traditionally, once wiped, the physical blocks become free for storing new data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0. General Overview
  2.0. Structural Overview
  3.0. Functional Overview
  4.0. Example Implementation Details
  5.0. Example Embodiments
  6.0. Implementation Mechanism—Hardware Overview
  7.0. Extensions and Alternatives

1.0. General Overview

Approaches, techniques, and mechanisms are disclosed for enhancing the operation of a solid-state storage system, such as a Flash-based block storage device. According to an embodiment, a host system uses a trim or similar command to free up memory space in a Flash or other solid state storage device for the purpose of reserving this space for high-performance write operation(s) with specific quality-of-service requirements. Such operations may include, for example, and without limitation, a high-speed backup of data from volatile memory to non-volatile memory. Such backups may occur, again by way of non-limiting example, during an emergency power-down event or other type of event where the host computer needs to move content from volatile system memory to the primary storage media in order to preserve the state of the host computer at that time.

In some embodiments, traditional memory management techniques may not be able to guarantee that the trimmed space would be reserved for the specific write operation as intended. For example, during the continued operation of the operating system, the storage device may utilize the physical blocks that were made available by the trim command to store logical blocks of data generated by operations other than the operation for which the operating system intended to free the space. The result may be insufficient contiguous physical blocks to perform a high performance write to continuous physical blocks in the primary storage media.

According to an embodiment, instead of releasing the physical memory space mapped to the trimmed logical address range after certain trim operations, the memory controller of the storage device keeps the physical memory space reserved for the trimmed logical address range until the host system explicitly writes to a logical address within the trimmed logical address range. Because the physical memory space is still mapped to the trimmed logical address range, it cannot be remapped to other logical addresses for other operations.

According to an embodiment, data is transferred to a logical block address. The data is stored in a physical block of a storage array that is associated with the logical block address. A trim command is received for the logical block address. A reserved physical block associated with the logical block address of the trim command is established. The physical block, while reserved, is written only in response to write requests that are directed to the logical block address specified in the trim command.

According to an embodiment, a Flash-based block storage system with trimmed space management comprises: a system interface, a data engine coupled to the system interface, a storage array coupled to the data engine, and a device processor, coupled to the data engine. The device processor is configured to transfer data, through the system interface, to a logical block address. The device processor is further configured to store the data in a physical block, of the storage array, associated with the logical block address. The device processor is further configured to receive a trim command for the logical block address. The device processor is further configured to establish a reserved physical block associated with the logical block address of the trim command. The device processor is further configured to write to the reserved physical block, when reserved, only in response to write requests that are directed to the logical block address specified in the trim command.

According to an embodiment, a previously reserved physical block (i.e. a physical block reserved in response to a trim operation on a logical block address mapped to the physical block) may automatically become unreserved in response to a write request that targets the logical block address. In an embodiment, the physical block may also or instead become unreserved in response to a variety of other events or series of events, such as the lapsing of a default amount of time, the reception of a certain write operation, a power-related event, a general command to remove any reservations, a specific command to unreserve the physical block, and so forth. Once the reservation is removed, the physical block may be reclaimed for use in storing other data (e.g. mapped to a new logical block address to which new data is written).

According to an embodiment, a mapping is stored between a host logical address range and a physical address range in a storage system. A system interface receives a trim command specifying the host logical address range. Responsive to the trim command, data in the physical address range mapped to the host logical address range is wiped, reserved, or both. Subsequent to the trim command, a write request is received for the host logical address range reserved by the trim command. The write request may be, for example, for a high-performance write operation. Responsive to the write request, and based on the reserved mapping, data specified by the write request is written to physical address range reserved by the trim command. Further responsive to the write request, the mapping is marked as unreserved.

According to an embodiment, host software may generate a first data for storing in a logical block address range of the Flash-based block storage system (e.g. while executing an application software, process, or thread). The host software may at some point identify the first data as unnecessary (e.g. upon detecting that the first data is cached data that has become stale, upon detecting an explicit delete operation, upon detecting completion of the execution of the application software, process, or thread, etc.). The host software may, in some cases, assert a trim command for the logical block address (LBA) range to release the physical storage holding the first data. However, in an embodiment, in the event a high performance write could be pending (e.g. for emergency power-down or quality of service (QoS) subscription), the host software can assert the trim command for the logical block address range to cause the physical memory holding the first data to be reserved. Subsequently, the host software may transmit the high performance write of a second data to the logical block address range in order to write to the reserved physical memory. In between the reservation and the write operation, according to embodiments, the reserved physical memory cannot be diminished by garbage collection or other write operations, not in the LBA range, issued by the host software. In an embodiment, the reservation is released and the host software may write second data to the physical storage of the logical block address range.

According to embodiments, a Flash-based block storage device may be configured to determine whether to reserve the memory targeted by a trim command, such that for certain trim commands the memory is not reserved, while for others the memory is reserved. For example, to differentiate between conventional trim commands, for which the memory is reserved, and trim commands for which the memory should be reserved in accordance to the described techniques, a host system may set a flag or specify a command parameter that instructs the Flash-based block storage device how to act. As another example, the Flash-based block storage device may be configured to determine how to act based on a particular context in which the trim command is received. Among other aspects, the particular context can include, for example, a certain sequence of commands received prior to the trim operation (e.g. special write operations) signal to the Flash-based block storage device that the host system plans on using newly trimmed space for an upcoming high-performance write operation or other special write operation. The particular context can also include, for example, LBA range size to be trimmed and/or the location of the LBA range to be trimmed.

As yet another example, the Flash-based block storage device may be configured to determine how to act based on the trim command matching certain triggering criteria, such as an LBA range size to be trimmed, the location of the LBA range to be trimmed, a specific sequence of commands, flags within the trim command, or a combination thereof. Such triggers may be set by the host through one or more configuration commands, or set internally in accordance with a controller firmware algorithm. For example, the Flash-based block storage device may be configured to reserve the memory targeted by the trim command based on the size of the logical address range to be trimmed exceeding a threshold established by a configuration command from the host or determined algorithmically (e.g. based on historical usage and/or predicted usage) by the controller firmware algorithm. In yet other embodiments, the Flash-based block storage device is configured to always respond to a trim command by reserving the trimmed memory space.

In other aspects, the invention encompasses computer apparatuses and/or computer-readable media configured to carry out the foregoing techniques.

2.0. Structural Overview

Figure 1:
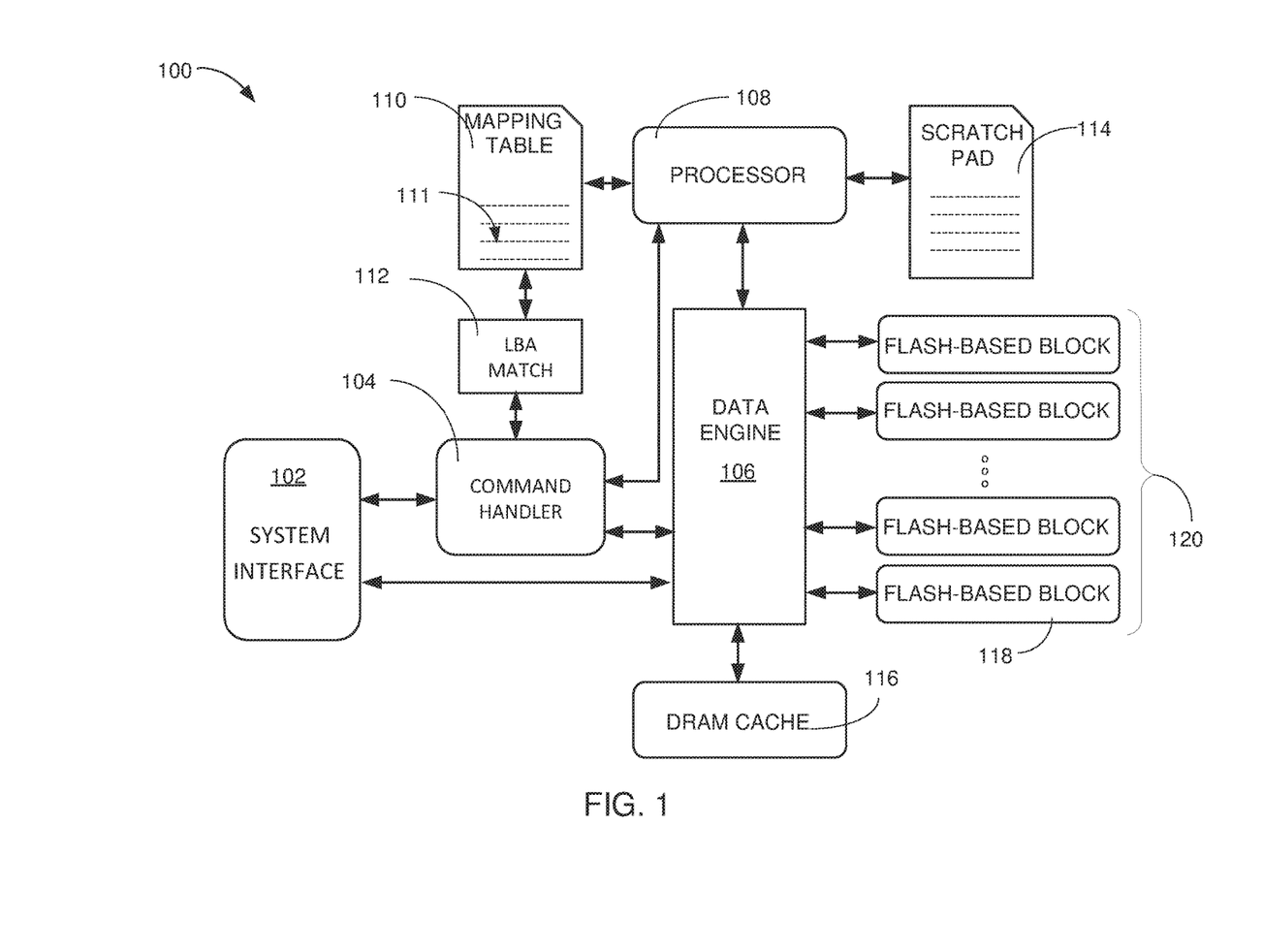
FIG. 1 is a block diagram of a Flash-based block storage system with trimmed space management mechanism in an embodiment of the present invention.

FIG. 1 is an illustrative view of various aspects of an example Flash-based block storage system with trimmed space management in which the techniques described herein may be practiced, according to an embodiment. The Flash-based block storage system 100 comprises a system interface 102 coupled to a command handler 104 and a data engine 106, which are managed by one or more device processors 108.

System interface 102 may be, for example, a serial advanced technology attachment (SATA)™ or serial attached small computer system interface (SAS)™. The system interface 102 can be coupled to the command handler 104, which can decode, error check, parse, and commence execution of commands received via the system interface 102. Such commands can be received from a variety of external components, depending on the embodiment, such as a host processor (not shown).

The command handler 104 may be any suitable hardware accelerator for decoding and executing commands received through the system interface 102. The command handler 104 may be, for example, a mix of combinational logic, a program sequencer, a sequential state machine, and so forth. The command handler 104 manages the receipt of commands, from the system interface 102, decodes the commands, manages the execution of the commands, and performs error management and recovery for transactions with the system interface 102. In an embodiment, the command handler can differentiate between a conventional trim command and a trim command in response to which the trimmed space should be reserved based on context, parameters included with the command, flags, or other information.

The command handler 104 may be coupled to the device processor 108, such as a microprocessor, or an embedded microcomputer. The device processor 108 controls the overall operation of the Flash-based block storage system 100. In some embodiments, device processor 108 may do so without necessarily being involved with every data transfer request from the host interface 102. The device processor 108 may be interrupt driven, operate by polling, or a combination thereof. The device processor 108 may be coupled to a scratch pad memory 114 for maintaining pointers and information relating to the maintenance of user data and communication with the command handler 104, the data engine 106, a mapping table 110, or a combination thereof. As used herein, "user data" may in fact be any data stored at the request of an external host system, and the term "user" is used simply for notational purposes.

The mapping table 110 can be a register array, non-volatile memory, or stored in a local cache 116 (e.g. in DRAM), which is accessed by the device processor 108 and a logical block address match block 112 in order to manage the storage location and accesses of the data transferred through the system interface 102. The mapping table 110 can keep location records 111, such as logical-to-physical block mappings of data transferred through the system interface 102.

The logical block address match block 112 is coupled between the command handler 104 and the mapping table 110. The logical block address match block 112 can translate host logical block requests into physical device or other virtual device requests and quickly identify whether a block of data, received through the system interface 102, is referenced in the mapping table 110. The logical block address match block 112 can update the mapping table 110 to add logical block addresses for newly written or updated user data. In some embodiments, the logical block address match block 112 may do so without intervention by the device processor 108. The device processor 108 may update the mapping table 110 when the user data has been written to a physical memory location.

The mapping table 110 maps host logical block addresses from the logical block address match block 112 to corresponding physical memory block addresses, as well as to pages and offsets within a particular physical Flash memory. The physical Flash memory can alternatively be an external solid state storage device (SSSD). The logical block address match block 112 converts from a host logical block address to a physical Flash memory page and offset by using a look up function against the mapping table 110.

The command handler 104 may further be coupled to the data engine 106. The data engine 106 may receive input directly from the command handler 104 for storing or accessing a block of the data transferred through the system interface 102. The data engine 106 may optionally hold the data transferred through the system interface 102 in the local cache 116, such as a dynamic random access memory (DRAM) cache. The local cache 116 is an optional addition to the Flash-based block storage system 100. If the local cache 116 is not utilized, the data engine 106 can transfer the data directly to a Flash-based block storage device 118, such as a Flash memory device, a Serial Advanced Technology Attachment (SATA) disk drive (not shown), or a serial attached SCSI (SAS) disk drive (not shown). If the local cache 116 is utilized, the data engine 106 can maintain the data in the local cache 116 while waiting for an optimal time to transfer the data to the Flash-based block storage device 118, or the data engine 106 can transfer the data through the system interface 102 directly to the Flash-based block storage device 118.

The data engine 106 may access the Flash-based block storage device 118 for storing or retrieving user data transferred through the system interface 102. As a block of data is accessed through the system interface 102, the command handler 104 communicates the operation to the logical block address match block 112 in order to update the location records 111, for the block of the data, in the mapping table 110. The command handler 104 may configure the logical block address match block 112 to recognize access to a reserved logical block address or address range. The logical block address match block 112 may alert the command handler 104 when a match is detected for the reserved logical block address or address range. The command handler 104 then notifies the device processor 108 of the activity to the reserved logical block address or address range.

The mapping table 110 may be updated by the device processor 108 for maintenance processes that change the physical location of the user data stored within a storage array 120. Examples of such maintenance processes include, without limitation, garbage collection, data retention refresh, data error correction, wear leveling, and reserved memory retention. The data engine 106 may perform the actual service of the maintenances processes under guidance of the device processor 108. The movement of the block of data, initiated by the device processor 108, stores the block of data in an appropriate location in the storage array 120. Storage array 120 may be, for example, an attached Flash memory device 216, a solid state disk 218, a network connection 220 to an array of solid state disks 222, or a combination thereof. The device processor 108 updates the mapping table 110 to reflect any changes to the physical location of the user data.

In an embodiment, the Flash-based block storage system 100 enhances system performance by storing the user data in one or more of the Flash-based block storage device 118 while still providing reliable use of the user data. The location of the user data may be monitored by the logical block address match block 112 and the mapping table 110. The device processor 108 monitors the command flow detected by the command handler 104 for identifying a reserved logical block address or address range. The command handler 104 alerts the device processor 108 when a command is received, through the system interface 102, that accesses the reserved logical block address or address range in the storage array 120.

The Flash-based block storage system 100 illustrates only one of many possible arrangements of components configured to provide the functionality described herein. Other arrangements may include fewer, additional, or different components, and the division of work between the components may vary depending on the arrangement. For example, in another embodiment, a host processor may instead reside in the block storage device, such as in a Peripheral Component Interconnect Express (PCIe) attached Non-Volatile Memory (NVMe)-based storage system.

3.0. Functional Overview

Figure 5:
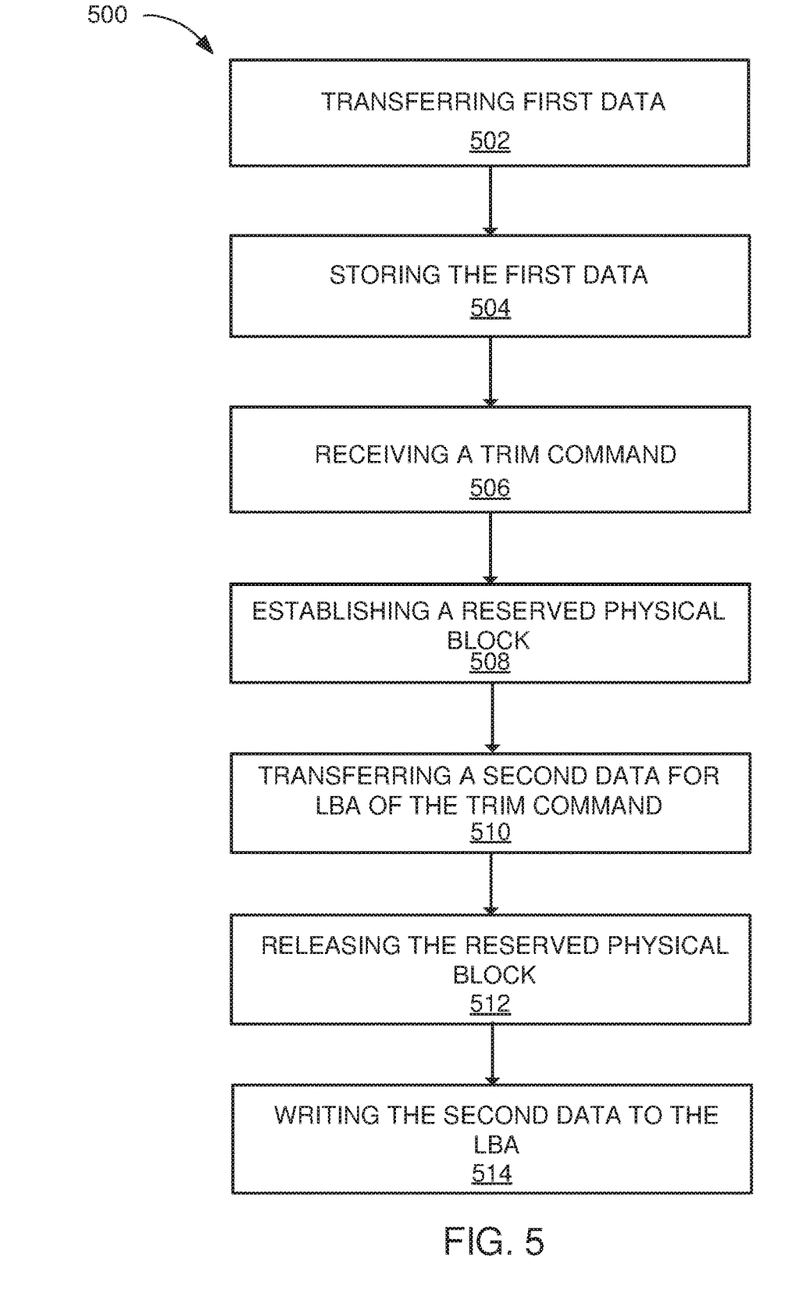
FIG. 5 is a flow chart of a method of operating the Flash-based block storage system in an alternative embodiment.

FIG. 5 illustrates a flow 500 of operating a Flash-based block storage system, such as system 100, according to an embodiment. Block 502 comprises transferring first data to a logical block address. Block 504 comprises storing the first data in a physical block, of a storage array, associated with the logical block address. The first data may be any data, such as data from an application executing on a host system coupled to the Flash-based block storage system.

Block 506 comprises receiving a trim command for the logical block address. The command may optionally include a parameter indicating to reserve the trimmed space. The trimmed command may have been received from the host system for a variety of reasons, as explained elsewhere. Block 508 comprises establishing a reserved physical block associated with the logical block address of the trim command. The Flash-based block storage system may do so automatically in response to all trim commands, or only in response to certain trim commands, based on a parameter specified in the command, or based on other context information as described previously.

Block 510 comprises transferring second data for writing to the logical block address of the trim command. The second data may be, for example, data for a high-performance write operation or, a special write operation for which a host system intended to reserve the trimmed memory. Block 512 comprises releasing the reserved physical block associated with the logical block address. This may be done automatically in response to detecting that the second data is being written to the logical block address, or in response to some other triggering event. Block 514 comprises writing the second data to the logical block address. Block 514 may be performed, in some embodiments, prior to block 512.

Flow 500 is but one process flow for utilizing the described Flash-based block storage system. Other flows may comprise fewer or additional elements in varying arrangements. For example, in embodiments where block 512 is triggered by some other event than the write operation of block 510, blocks 510 and 514 may be optional.

In certain embodiments, reserving of the physical blocks associated with the logical block addresses trimmed by the host CPU provides for high performance write operations into contiguous memory without having to relocate any existing data that might cause the high performance write operation to split. This reserved physical block region may then be used for memory dumps in the event of unexpected power-down or for high speed writes managed by a QoS component.

Figure 2:
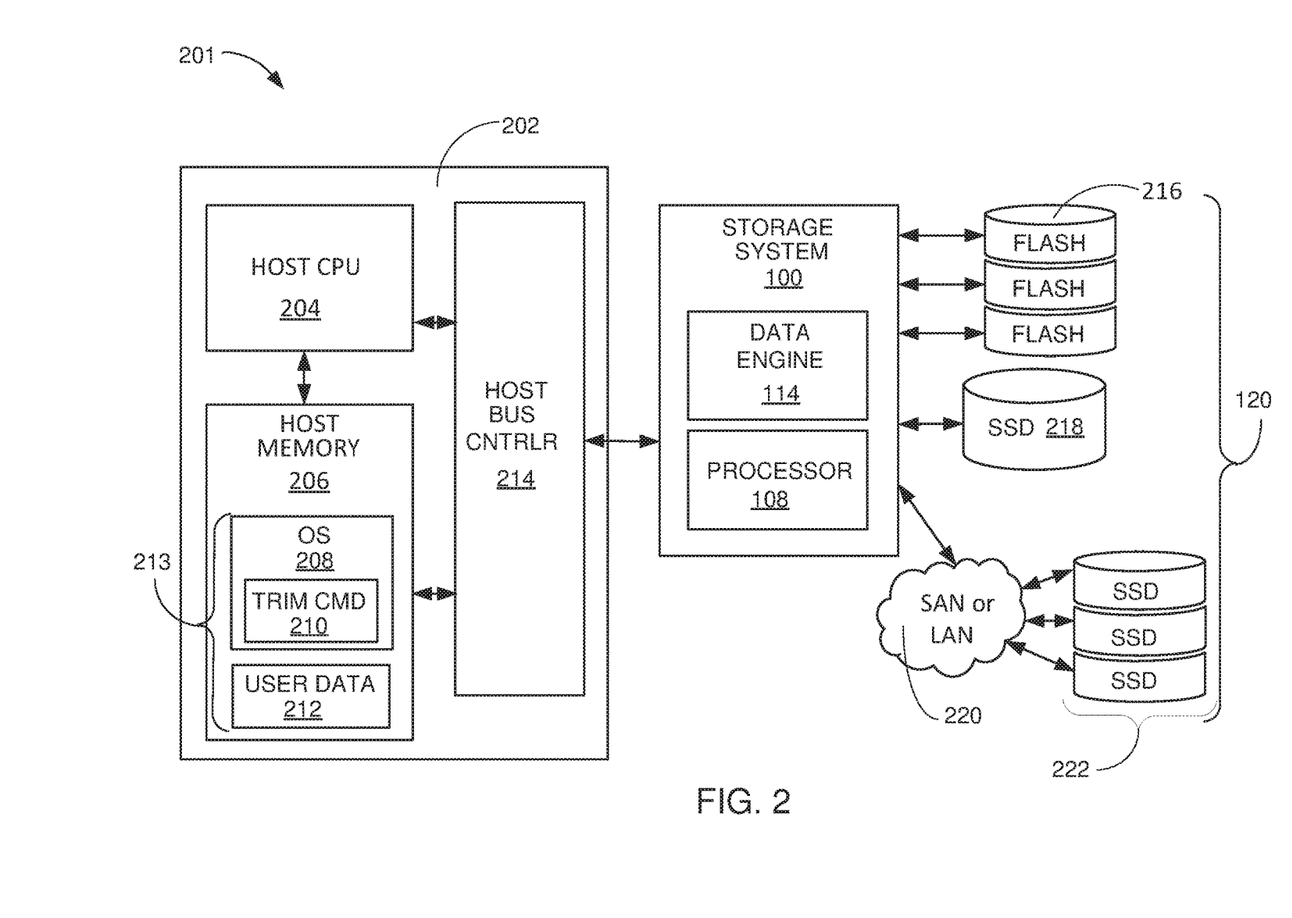
FIG. 2 is a block diagram of a host computer system with the Flash-based block storage device in an embodiment.

Example enhancements to the operations of Flash-based block storage system are now described with respect to an example host system. FIG. 2 is a block diagram of an example host computer system 201 that utilizes the Flash-based block storage system 100, according to an embodiment. System 201 includes a host computer 202 coupled to the Flash-based block storage system 100.

The host computer 202 includes a host central processing unit (CPU) 204 coupled to a host memory 206 configured to execute an operating system (OS) 208. OS 208 may be configured to send a variety of commands to Flash-based block storage system 100, including a trim command 210. The host CPU 204 generates user data 212 to be stored in the Flash-based block storage system 100. The host CPU 204 may determine that a logical block or a range of logical blocks ("block range") storing user data 212 in the Flash-based block storage system 100 is no longer needed. The host CPU 204 may accordingly transfer a trim command 210 through a host bus controller 214 to the Flash-based block storage system 100.

The trim command 210 instructs the Flash-based block storage system 100 to delete the user data 212 represented by the logical block or block range stored in the storage array 120. The exact syntax of the trim command 210 may vary depending on the interface. For example, trim command 210 may be a "trim" command for an SATA interface, an "unmap" command in the SAS interface, or any other equivalent command. The device processor 108 is alerted to the receipt of the trim command 210. The device processor 108 causes the data engine 106 to delete the logical block or block range identified by the trim command 210.

In an example embodiment, the device processor 108 may allocate an equivalent capacity to the logical block or block range, that is currently uncommitted to data, and flag the actual physical location of the logical block or block range for garbage collection by a background task. The device processor 108 may also flag the physical capacity, identified by the logical block or block range in the mapping table 110 of FIG. 1, as reserved and not available for background maintenance tasks or interface activity outside the logical block or block range identified in the trim command 210. This has the effect of providing the host CPU 204 with a readily available storage capacity for high priority write commands.

The data engine 106 accesses the storage array 120. The data engine 106 notifies the device processor 108 of the physical location of the capacity reserved as a result of the trim command 210. The device processor 108 maintains the reserved state of the capacity identified by the trim command 210 until a new host command is received that addresses the logical block or a range of logical blocks that is reserved.

In an embodiment, storage array 120 includes the attached Flash memory device 216, the solid state disk 218, and/or the array of solid state disks 222, which are managed by the data engine 106 as contiguous accessible memory of the storage array 120.

In an embodiment, the device processor 108 may cause the data engine 106 to allocate the physical capacity having the lowest latency to the reserved capacity. Among other aspects, in certain embodiments, this may allow for greater performance for a subsequent priority write command issued by the host CPU 204.

System 201 is but one example of a system in which the described Flash-based block storage system 100 may be utilized. Other systems may comprise additional or fewer elements, in potentially varying arrangements.

4.0. Example Implementation Details

Figure 3:
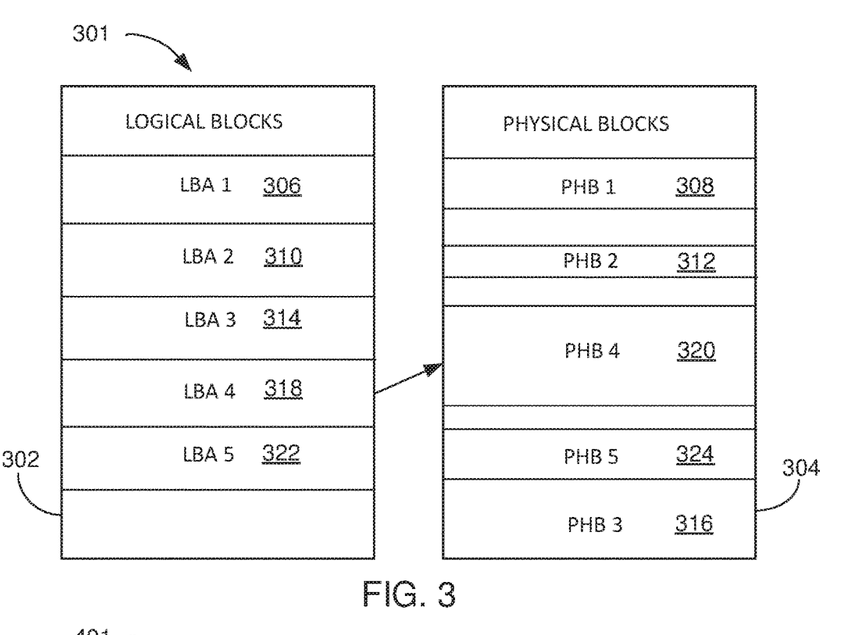
FIG. 3 is a memory map of the Flash-based block storage system during operation in an embodiment.

Example operations of the described Flash-based block storage systems are now illustrated with respect to several example memory maps that change over time as a result of the operations. FIG. 3 depicts an example memory map 301 of a Flash-based block storage system, such as system 100, during operation, according to an embodiment. The memory map 301 maps logical blocks 302, as referenced by a host system (e.g. host CPU 204 of FIG. 2), and physical blocks 304, as stored by a data engine in a storage array (e.g. by the data engine 106 of FIG. 1 in storage array 120 of FIG. 1).

For example, a logical block address 1 (LBA 1) 306, when transferred through an interface such as the system interface 102 of FIG. 1, is written to physical blocks 1 (PHB 1) 308. The LBA 1 306 may be one or more logical blocks in length. The host system may cause user data, such as the user data 212 of FIG. 2, to be written as the LBA 1 306, which is active as long as the host system is actively using the user data stored in LBA 1 306. The physical location in the storage array that actually contains the user data associated with LBA 1 306 is the PHB 1 308, which may be relocated during the use of the user data 212 based on, for example, refresh rates and maintenance of the memory cells storing the user data 212. Any relocation of the PHB 1 308 is updated in the mapping table, such that any access of the LBA 1 306 will access the correct physical location of the PHB 1 308.

Similarly, LBA 2 310 is written by the host system to physical blocks 2 (PHB 2) 312. The actual number of the data blocks in the user data of LBA 2 310 may be different from the number of data blocks in the user data of LBA 1 306. By way of an example, PHB 2 312 is shown in proximity to PHB 1 308, but the physical locations of any of the user data may be determined by the data engine, and have no relation to the logical block numbers assigned by the host system.

In an embodiment, LBA 3 314, LBA 4, 318, and LBA 5 322 may be transferred by the host system to the Flash-based block storage system 100. The host system controls the actual number of blocks of the user data associated with the LBA 3 314, LBA 4, 318, and LBA 5 322, but the data engine makes the determination of where PHB 3 316, PHB 4, 320, and PHB 5 324 are physically located. By way of an example, PHB 4 320 may be positioned between PHB 2 312 and PHB 5 324, and separated by unallocated memory space, while PHB 3 316 may be directly adjacent to PHB 5 324 in contiguous memory.

In an embodiment, the device processor 108 of FIG. 1 may control the selection of the physical location used by the data engine 106 for storing the PHB 1 308, the PHB 2 312, the PHB 3 316, the PHB 4, 320, and the PHB 5 324, or allow the data engine 106 to select contiguous memory based on availability.

Figure 4:
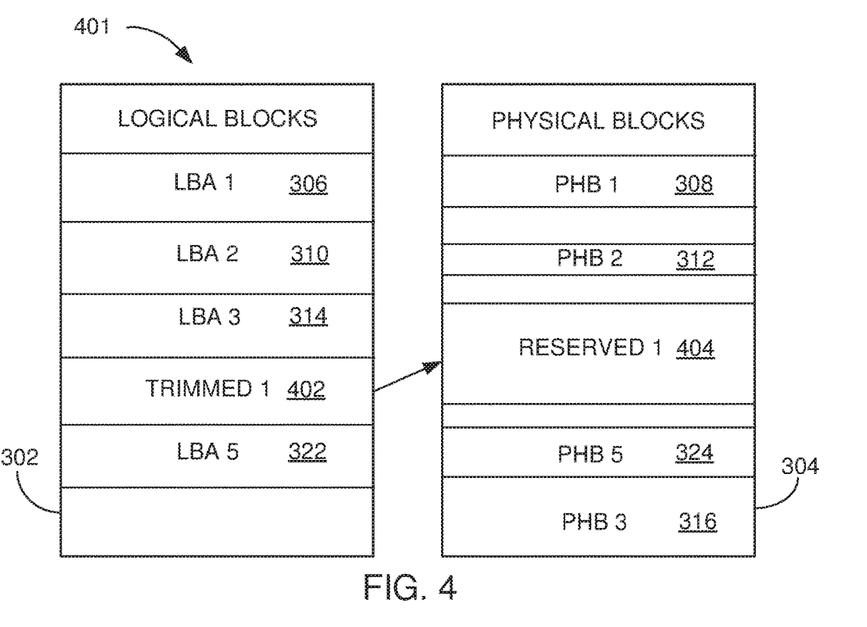
FIG. 4 is a memory map of the Flash-based block storage device after a trim command in an embodiment.

FIG. 4 depicts an example memory map 401 of a Flash-based block storage system, such as system 100, after a trim command, such as trim command 210, according to an embodiment. As the host system completes an application and the user data is no longer needed, the host system may prepare for a high performance write command to contiguous memory in the storage array. The high performance write can be, for example, a dump of the host memory 206 of FIG. 2 initiated by a power-down or a quality of service (QoS) write for an application executed by the host CPU 204.

A reallocation of contiguous memory can be accomplished by the host system sending a trim command to the Flash-based block storage system that identifies the logical block address or address range that is to be trimmed. By way of an example, the host CPU 204 may identify LBA 4 318 of FIG. 3 as the target of the trim command 212. The device processor 108 of FIG. 1 may update the mapping table 110 of FIG. 1 to indicate the LBA 4 318 is now identified as trimmed blocks 1 402. The physical blocks that were referenced in the mapping table 110 as PHB 4 320 of FIG. 3 are updated to become reserved physical blocks 1 404. The device processor 108 may establish the reserved status of the reserved physical blocks 1 404 in the data engine 106 of FIG. 1 in order to preserve the contiguous memory through maintenance process, such as garbage collection, data error correction, cell wear leveling, and data erasure.

The data engine 106 will maintain the contiguous memory available as reserved physical blocks 1 404 until notified by the device processor 108 that the reservation has been canceled. The host system may utilize the trimmed blocks 1 402 by sending a write command that addresses any of the user data that falls within the range of data blocks that were previously identified as LBA 4 318. The device processor 108 may instruct the data engine 106 to execute the new write command within the physical blocks identified as the reserved physical blocks 1 404. The data engine 106 may remove the reserved status from any of the physical blocks within the reserved physical blocks 1 404 that are not addressed by the new write command. The device processor 108 may then update the mapping table 110 indicating the current LBA, provided by the host system, and the physical blocks that were actually written by the data engine 106.

Once a host system issues a write command that falls within the trimmed blocks 1 402, the reserved physical blocks 1 404 are freed for normal operational access and background maintenance processes. The host system can issue a trim command that includes more than one of the LBA ranges. In an example embodiment, a host system can issue a trim command that includes LBA 1 306 and LBA 4 318, which can become trimmed blocks 1 402 and trimmed blocks 2 (not shown). The device processor 108 may configure the data engine 106 to establish the reserved physical blocks 1 404 and reserved physical blocks 2 (not shown). The data engine 106 may use background maintenance processes to migrate the two reserved physical block regions into a single contiguous memory segment that can be released independently or concurrently based on the write commands issued by the host system.

5.0. Example Embodiments

Examples of some embodiments are represented, without limitation, in the following clauses:

According to an embodiment, a method comprises: transferring first data to a logical block address; storing the first data in a physical block, of a storage array, associated with the logical block address; receiving a trim command for the logical block address; establishing a reserved physical block associated with the logical block address of the trim command; transferring second data for writing to the logical block address of the trim command; releasing the reserved physical block associated with the logical block address; and writing the second data to the logical block address.

In an embodiment, transferring the first data to the logical block address is performed while writing a range of logical block addresses in the storage array.

In an embodiment, receiving the trim command, including the parametric enable, identifies a range of logical block addresses, including the logical block address of the first data.

In an embodiment, establishing the reserved physical block includes maintaining availability of the physical block addresses associated with the logical block address of the trim command.

In an embodiment, establishing the reserved physical block is responsive to determining, based on information included in the trim command or a context in which the trim command is received, that the physical block is to be reserved, and the method further comprises receiving another trim command for a different logical block address, wherein a reservation is not established for the different block address in response to the other trim command.

In an embodiment, storing the first data in the physical block includes writing the first data to a Flash memory, a solid state disk (SSD), or a network attached SSD array.

In an embodiment, establishing the reserved physical block associated with the logical block address includes updating a mapping in a mapping table between the logical block address and the reserved physical block.

According to an embodiment, a method comprises: storing a mapping between a host logical address range and a physical address range in a storage system; receiving a trim command specifying the host logical address range; responsive to the trim command, marking the physical address range mapped to the host logical address range as reserved; subsequent to the trim command, receiving a write request for the host logical address range; responsive to the write request, based on the reserved mapping, writing data specified by the write request to physical address range; and further responsive to the write request, marking the mapping as unreserved.

In an embodiment, the method further comprises marking the mapping as reserved only if the trim command matches certain triggering criteria or is received in a particular context, the mapping otherwise deleted.

In an embodiment, the write request is for a high-performance write operation.

According to an embodiment, a Flash-based block storage system comprises: a system interface; a data engine coupled to the system interface; a storage array coupled to the data engine; and a device processor, coupled to the data engine, configured to: transfer first data, through the system interface, to a logical block address; store the first data in a physical block, of the storage array, associated with the logical block address; receive a trim command for the logical block address; establish a reserved physical block associated with the logical block address of the trim command; transfer second data for writing to the logical block address of the trim command; release the reserved physical block associated with the logical block address; and write the second data to the logical block address.

In an embodiment, the device processor is configured to transfer the first data to the logical block address while writing a range of logical block addresses in the storage array.

In an embodiment, the system further comprises a command handler, coupled to the system interface, configured to receive the trim command, the trim command identifying a range of logical block addresses.

In an embodiment, the device processor is further configured to establish the reserved physical block by configuring the data engine to maintain availability of the physical block addresses associated with the logical block address of the trim command.

In an embodiment, establishing the reserved physical block is responsive to determining, based on information included in the trim command or a particular context in which the trim command is received, that the physical block is to be reserved, the device processor further configured to receive an other trim command for a different logical block address, wherein a reservation is not established for the different logical block address in response to the other trim command.

In an embodiment, the system further comprises a command handler, coupled to the system interface, configured to: recognize that the trim command includes a second logical block address; and notify the device processor to establish a second reserved physical block associated with the second logical block address.

In an embodiment, the storage array coupled to the data engine includes Flash memory, a solid state disk (SSD), or a network attached SSD array configured to write the user data in the physical blocks.

In an embodiment, the system further comprises a command handler, coupled to the system interface, configured to: identify the first data received for the logical block address in the trim command; and notify the data engine to write the first data to the reserved physical block.

In an embodiment, the data engine is configured to transfer a range of logical block addresses to the storage array.

In an embodiment, the system further comprises a mapping table, coupled to the device processor, updated to identify a reserved mapping between the logical block address and the reserved physical block.

Other examples of these and other embodiments are found throughout this disclosure.

6.0. Implementation Mechanism—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   establishing a reservation identifying a reserved physical block region having a range of contiguous reserved physical block addresses;
   receiving a trim command for a logical block address associated with a target physical block located within the reserved physical block region;
   releasing an association between the target physical block and the logical block address of the trim command, and designating the target physical block a reserved physical block;
   updating a mapping table to prevent a write operation to the reserved physical block based on the reservation indicating the reserved block is in the reserved block region; and
   writing a user data to the contiguous reserved physical block addresses after releasing the reservation of the reserved physical block region.

2. The method as recited in claim 1, wherein establishing the reservation includes mapping the range of contiguous reserved physical block addresses to a range of logical block addresses.

3. The method as recited in claim 1, wherein receiving the trim command includes receiving the trim command with an enable parameter.

4. The method as recited in claim 1, wherein:
   releasing the reservation is based on a release event including one or more of: lapsing an amount of time, a power-related event, a general command to remove any reservation, a specific command to release the reservation, or a combination thereof.

5. The method as recited in claim 1, wherein updating the mapping table includes mapping another target logical block address to the reserved physical block.

6. The method as recited in claim 1, wherein writing the user data includes writing the user data to a Flash memory, a solid state disk (SSD), or a network attached SSD array.

7. The method as recited in claim 1, wherein updating the mapping table includes updating a mapping between the logical block address and the reserved physical block, the reserved physical block being a particular physical block of a non-volatile memory.

8. A method comprising:
   storing a mapping between a host logical address range and a physical address range in a storage system;
   receiving a trim command specifying the host logical address range;
   establishing a reservation identifying the physical address range having a range of contiguous reserved physical block addresses;
   responsive to the trim command, marking a portion of the physical address range mapped to the host logical address range as reserved in the reservation;
   blocking a maintenance task write operation to the physical address range based on the reservation;
   subsequent to the trim command, receiving a write request for the host logical address range;
   releasing the reservation of the physical address range mapped to the host logical address range; and
   responsive to the write request, based on the releasing of the reservation, writing data specified by the write request to physical address range.

9. The method as recited in claim 8, further comprising marking the physical address range mapped to the host logical address range as reserved only if the trim command matches certain triggering criteria or is received in a particular context, the mapping otherwise deleted.

10. The method as recited in claim 8, wherein writing the user data includes writing a power-down write operation or a quality of service write operation.

11. A Flash-based block storage system comprising:
    a system interface;
    a data engine coupled to the system interface;
    a storage array coupled to the data engine; and
    a device processor, coupled to the data engine, configured to:
       establish a reservation identifying a reserved physical block region having a range of contiguous reserved physical block addresses,
       receive a trim command for a logical block address associated with a target physical block located within the reserved physical block region;
       release the association between the target physical block and the logical block address of the trim command, and designate the target physical block a reserved physical block;
       update a mapping table to prevent a write operation to the reserved physical block based on the reservation indicating the reserved block is in the reserved block region; and
       write a user data to the contiguous reserved physical block addresses after releasing the reservation of the reserved physical block region.

12. The system as recited in claim 11, wherein the device processor is configured to map the range of contiguous reserved physical block addresses to a range of logical block addresses in the storage array.

13. The system as recited in claim 11, further comprising a command handler, coupled to the system interface, configured to receive the trim command, the trim command identifying a range of logical block addresses.

14. The system as recited in claim 11, wherein:
    the release event is one or more of: lapsing an amount of time, a power-related event, a general command to remove any reservation, or a specific command to release the reservation.

15. The system as recited in claim 11, wherein updating the mapping table includes mapping another logical block address to the reserved physical block.

16. The system as recited in claim 11, further comprising a command handler, coupled to the system interface, configured to:
    recognize that the trim command includes a second logical block address; and
    notify the device processor to establish a second reserved physical block associated with the second logical block address.

17. The system as recited in claim 11, wherein the storage array coupled to the data engine includes Flash memory, a solid state disk (SSD), or a network attached SSD array configured to write the user data in the target physical blocks.

18. The system as recited in claim 11, further comprising a command handler, coupled to the system interface, configured to decode, error check, parse, and commence execution of commands received via the system interface.

19. The system as recited in claim 11, wherein the data engine is configured to transfer a range of logical block addresses to the storage array.

20. The system as recited in claim 11, wherein the mapping table identifies a reserved mapping between the logical block address and the reserved physical block.

* * * * *